US006824114B1

(12) United States Patent
VanSkiver

(10) Patent No.: US 6,824,114 B1
(45) Date of Patent: Nov. 30, 2004

(54) LITTER SCOOP HOLDER

(75) Inventor: Ralph VanSkiver, Mansfield, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 0 days.

(21) Appl. No.: 10/725,389

(22) Filed: Dec. 3, 2003

(51) Int. Cl.$^7$ .............................................. A47G 29/00
(52) U.S. Cl. ............................ 248/220.21; 248/221.11; 248/222.51; D30/162
(58) Field of Search ............................. 248/311.2, 310, 248/314, 201, 220.21, 222.11, 222.51; D30/162; 220/23.83, 478, 481, 737

(56) References Cited

U.S. PATENT DOCUMENTS

| | | |
|---|---|---|
| 2,148,043 A | 2/1939 | Zero |
| 4,131,203 A | 12/1978 | Bridges |
| 4,926,794 A | 5/1990 | Yamamoto |
| 5,058,764 A | 10/1991 | Gaba |
| 5,261,577 A | 11/1993 | Goldstein |
| 5,322,183 A | 6/1994 | Strachan |
| 5,397,006 A | 3/1995 | Terrell |
| 5,404,800 A * | 4/1995 | Hsu ............................ 99/426 |
| 5,419,435 A | 5/1995 | Perzan |
| 5,435,511 A * | 7/1995 | Hsu ........................ 248/206.3 |
| 5,460,293 A | 10/1995 | Erickson |
| 5,613,660 A * | 3/1997 | Wyatt .......................... 248/300 |
| 5,647,502 A | 7/1997 | Marsh |
| 5,775,258 A * | 7/1998 | Larsen et al. ................ 119/161 |
| 5,782,203 A | 7/1998 | Tennen |
| 5,794,566 A | 8/1998 | Goetz |
| 5,850,957 A | 12/1998 | Morris |
| 5,855,186 A | 1/1999 | Larsen |
| 5,870,969 A | 2/1999 | Boyce |
| 6,039,368 A | 3/2000 | Kowalczyk |
| D429,853 S | 8/2000 | Hammond |
| 6,135,305 A | 10/2000 | Brady |
| 6,446,829 B1 | 9/2002 | Malvasio |
| D464,224 S * | 10/2002 | Moore ......................... D6/551 |
| D465,621 S * | 11/2002 | Dunn ........................ D30/162 |
| 6,578,807 B1 * | 6/2003 | Lipscomb et al. .......... 248/314 |

FOREIGN PATENT DOCUMENTS

JP          2000-161826      *    6/2000

* cited by examiner

*Primary Examiner*—Ramon O Ramirez
(74) *Attorney, Agent, or Firm*—Locke Liddell & Sapp LLP

(57) ABSTRACT

A litter scoop holder comprising a support member and a removable receptacle. The receptacle includes a floor, a front wall, a rear wall, and a pair of sidewalls to form a scoop pocket. The receptacle rear wall includes a tab and the floor includes a rib. The support member contains a rear wall and a floor to support the receptacle. The support rear wall includes a pocket to receive the receptacle tab and the support floor includes a flexible release tab having an aperture to receive the rib. When in the locked position, the receptacle tab is inserted into the support pocket and the receptacle is pivoted such that the rib slideable engages and defects the flexible release tab until the release tab aperture receives and secures the rib. To remove the receptacle, the release tab is pressed and the receptacle is pivoted in the opposite direction.

11 Claims, 5 Drawing Sheets

LITTER SCOOP HOLDER

TECHNICAL FIELD OF THE INVENTION

The present invention relates to a litter scoop holder, and more particularly, to a litter scoop holder having a support and a receptacle that is releasably connected to the support.

BACKGROUND OF THE INVENTION

Various litter scoop holders exist to receive and support cat litter box scoops. Many litter scoop holders are self-standing and are unable to be fixedly attached to litter boxes; thus, in many instances the litter scoop cannot be stored adjacent the litter box for ready use. In addition, because litter scoops must be stored away from the litter box, the scoops can be easily misplaced.

Other litter scoop holders are designed to be fixedly attached to litter boxes, however, many of these devices are difficult to securely fasten. Oftentimes, these devices can be easily separated inadvertently by a pet or the pet's owner.

The present invention is designed to overcome these disadvantages by providing a releasable litter scoop holder that can be easily detached for cleaning or replacement.

SUMMARY OF THE INVENTION

The present invention includes a litter scoop holder having a support member connected to a cat litter box and a scoop support receptacle detachably mounted to the support member. The receptacle can be configured in a locked position, where the receptacle is fixedly attached to the support and ready to receive and support a hand held litter scoop, or in an unlocked position, so that the receptacle can be easily removed without the use of tools for cleaning or replacement.

The receptacle is of a sufficient size to receive a standard hand litter scoop. The receptacle includes a floor, a front wall, a rear wall, and a pair of sidewalls forming a scoop pocket. In one embodiment, the receptacle rear wall incorporates a locking tab and the underside of the receptacle floor includes a rib extending therefrom.

The support member is adapted to releasably support the receptacle in the locked position. The support member includes a rear wall and a floor forming a receptacle support area. In addition, the support floor includes a flexible release tab having an aperture adapted to receive the receptacle rib. The support rear wall also includes a pocket adapted to engage the receptacle locking tab when configured in the locked position.

In order to place the receptacle in the locked position, the receptacle is angularly inserted into the receptacle support area to allow the receptacle locking tab to be inserted inside the support pocket. The bottom portion of the receptacle is then rotated toward the support rear wall so that the receptacle rib deflects and slideably engages the release tab until the rib is received inside the aperture on the support member floor. Once in this position, the release tab returns to its non-deflected position to securely fasten the receptacle to the support member.

When it is desired to remove the receptacle from the support member, the release tab is deflected by the user to permit removal of the receptacle rib from the rib aperture. This allows the receptacle to be pivoted away from the support in the opposite direction. As the receptacle is rotated away from the support, the locking tab is removed from the pocket allowing the receptacle to be separated from the support. When separated, the receptacle can be easily cleaned and then re-connected to the support member for future use.

In an additional embodiment, the support member can include a detent to engage a recess located underneath the receptacle floor. When the detent engages the recess, the receptacle is in the locked position. In order to release the receptacle, sufficient force is provided on the receptacle to rotate it away from the support in order to overcome the locking force cause by the detent.

DESCRIPTION OF THE PREFERRED EMBODIMENTS

Figure 1:
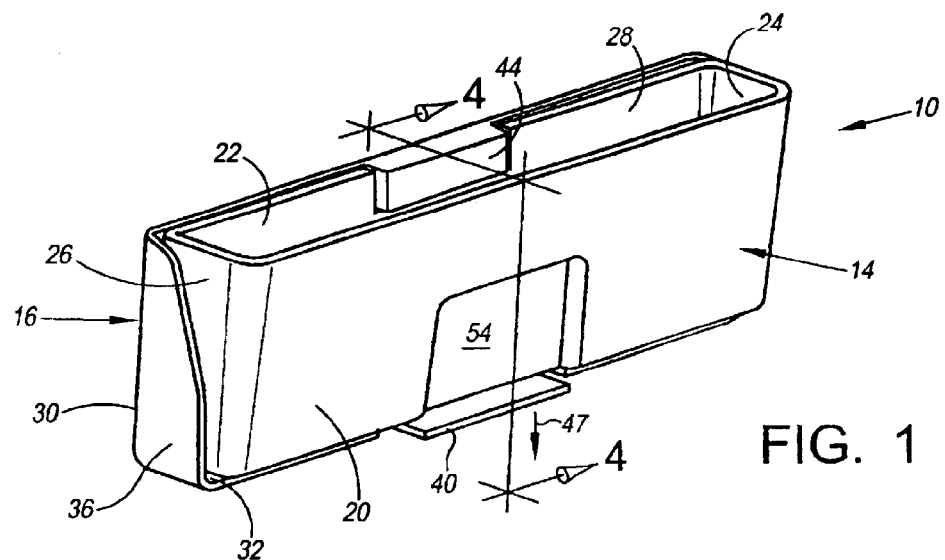
FIG. 1 is a front perspective view of the litter scoop holder in the locked position.
Figure 5:
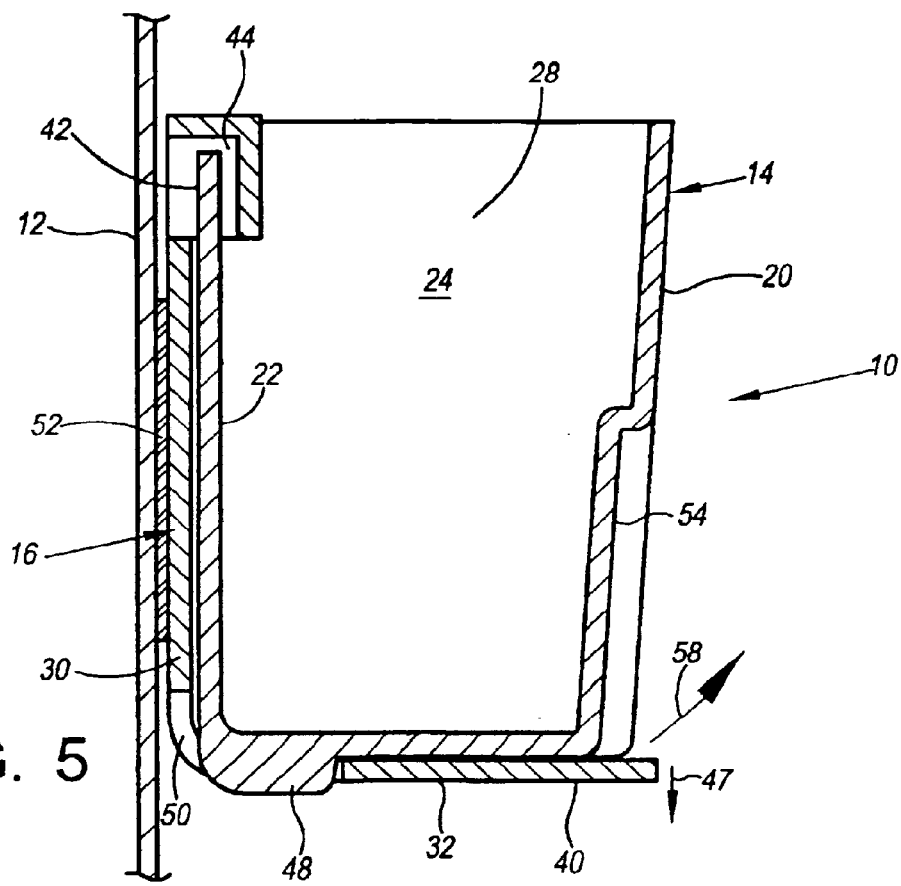
FIG. 5 is a section view of the litter scoop holder taken generally along the line 4—4 in FIG. 1 illustrating the litter scoop in the locked position.

FIG. 1 illustrates litter scoop holder 10 in the locked position. Litter scoop holder 10 is designed to be attached to a litter box 12 (FIG. 5) so that a litter scoop (not shown) can be easily stored adjacent litter box 12 when the scoop is not in use. In addition, litter scoop holder 10 can be attached to any other vertical surface, such as a wastebasket or wall, by way of example. As best seen in FIG. 5, support member 16 is attached to litter box 12 (or other vertical surface) preferably by double-sided adhesive tape 52. Other fastening techniques can include a hook and loop fastener and screws and bolts, by way of example.

Figure 2:
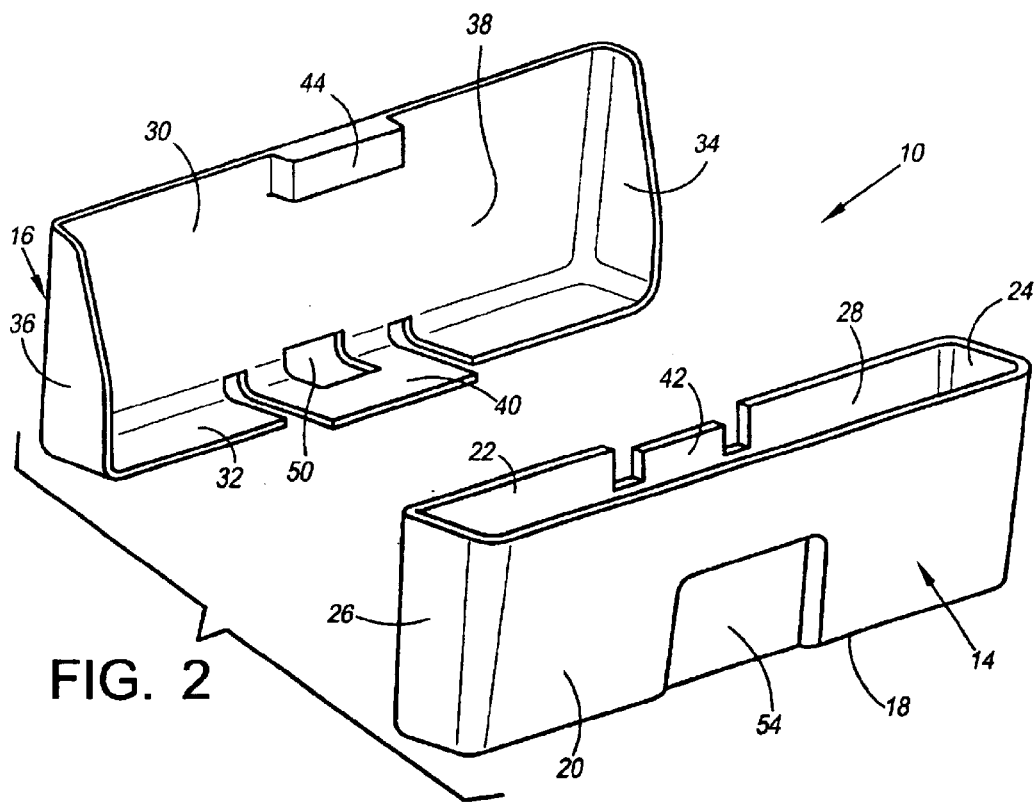
FIG. 2 is a front perspective view of the litter scoop holder in the unlocked position with the receptacle detached from the support.
Figure 3:
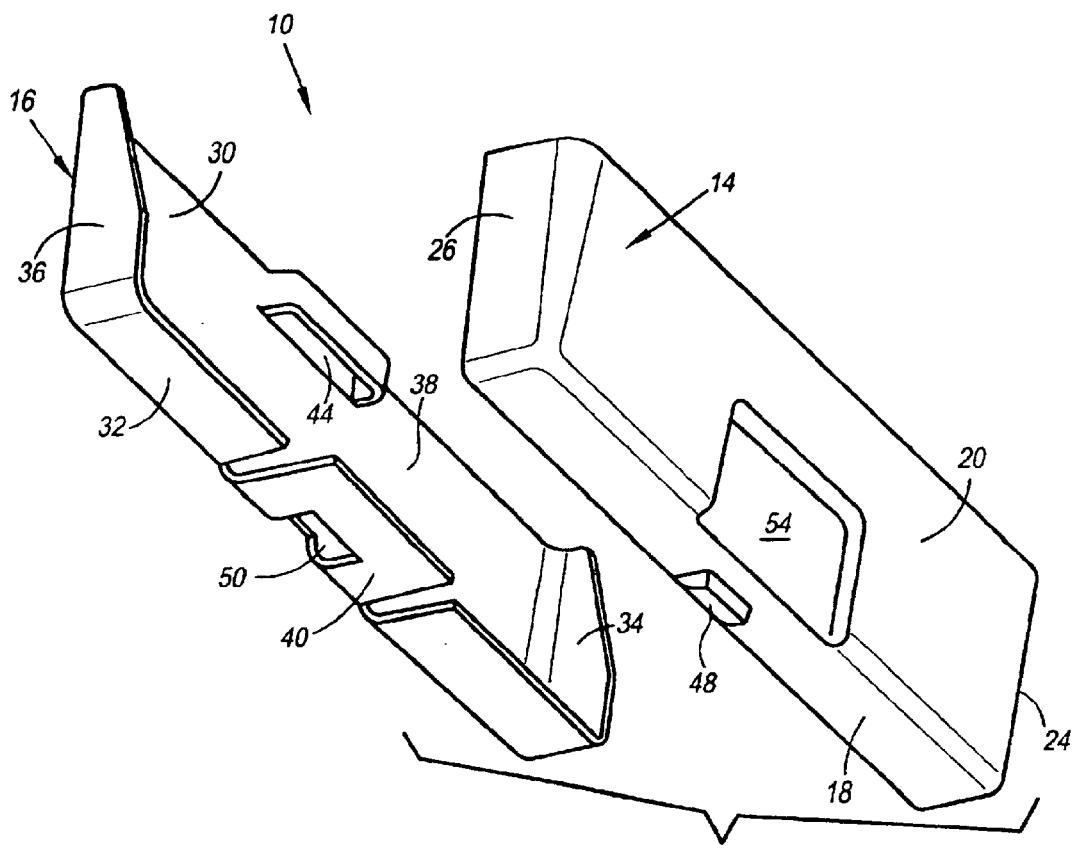
FIG. 3 is a bottom perspective view of the litter scoop holder in the unlocked position illustrating the receptacle rib and support release tab.

Litter scoop holder 10 includes a receptacle 14 releasably connected to a support 16. As seen in FIGS. 2 and 3, receptacle 14 includes a floor 18, a front wall 20, a rear wall 22, and a pair of sidewalls 24 and 26 to form a scoop pocket 28. Scoop pocket 28 is sufficiently sized to receive and support the scoop end of a litter scoop when inserted therein. Support 16 includes a rear wall 30, a floor 32, and sidewalls 34 and 36, together forming a receptacle support area 38. Sidewalls 34 and 36 are used to guide receptacle 14 when being attached to support 16 and also serve to limit the lateral or side to side movement of receptacle 14. Support floor 32 further includes a flexible release tab 40 for supporting receptacle 14 in the locked position (discussed in further detail below).

Figure 4:
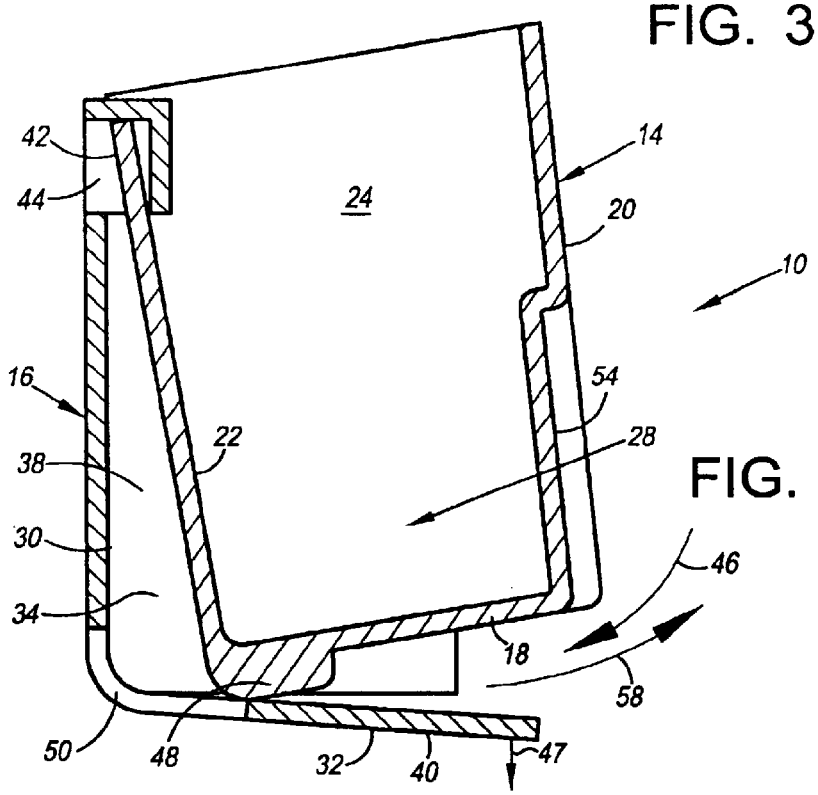
FIG. 4 is a section view of the litter scoop holder taken generally along the line 4—4 in FIG. 1 illustrating the receptacle being pivoted between the locked and unlocked positions.

As seen in FIG. 4, when it is desired to configure scoop holder 10 in the locked position, a locking tab 42, located on the top portion of receptacle rear wall 22 (FIGS. 2 & 3), is inserted into a pocket 44 (Best seen in FIGS. 3 & 4). After locking tab 42 is inserted into pocket 44, receptacle 14 is rotated in the direction of arrow 46 so that a rib 48, disposed underneath receptacle bottom wall 18, slideably engages and deflects release tab 40 in the direction of arrow 47 until rib 48 is received inside an aperture 50. As best seen in FIG. 5, when in this position, release tab 40 returns to its non-deflected position to prevent receptacle 14 from separating away from support 16. Release tab 40 is preferably integrally molded with support 16 and is flexible to allow easy deflection upon pressure being applied thereto. This allows receptacle 14 to be easily attached or removed from support 16 without the use of tools. While in this position, receptacle 14 is securely fastened in the locked position and cannot be pulled or lifted away from support member 16. Thus, when in the locked position, the user can insert or remove the scoop end of a litter scoop without the receptacle separating from the support.

Receptacle front wall 20 includes a recessed area 54 so that when it is desired to release receptacle 14 from support member 16, the user can insert his or her finger(s) inside recessed area 54 to provide access to easily deflect release tab 40 in the direction of arrow 47 (FIGS. 1 & 5). When release tab 40 is deflected, receptacle 14 is pivoted in the direction of arrow 58 (FIGS. 4 & 5) so that rib 48 and tab 42 are removed from aperture 50 and pocket 44 respectively. When removed, receptacle 14 can be easily cleaned or replaced.

Figure 6:
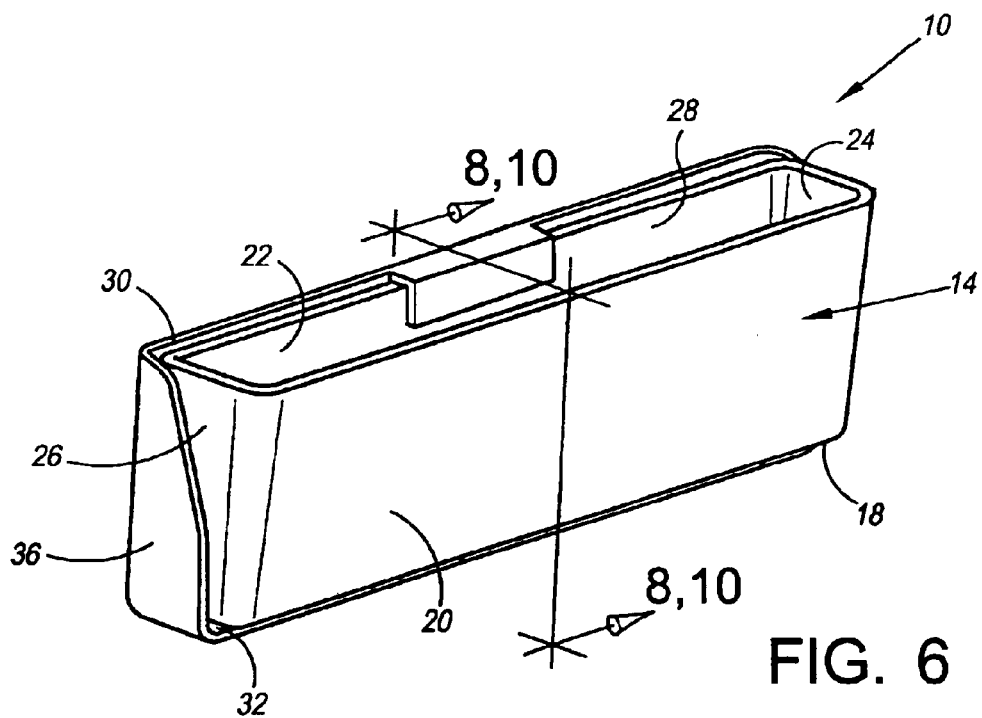
FIG. 6 is a front perspective view of a second embodiment of the litter scoop without the release tab.
Figure 7:
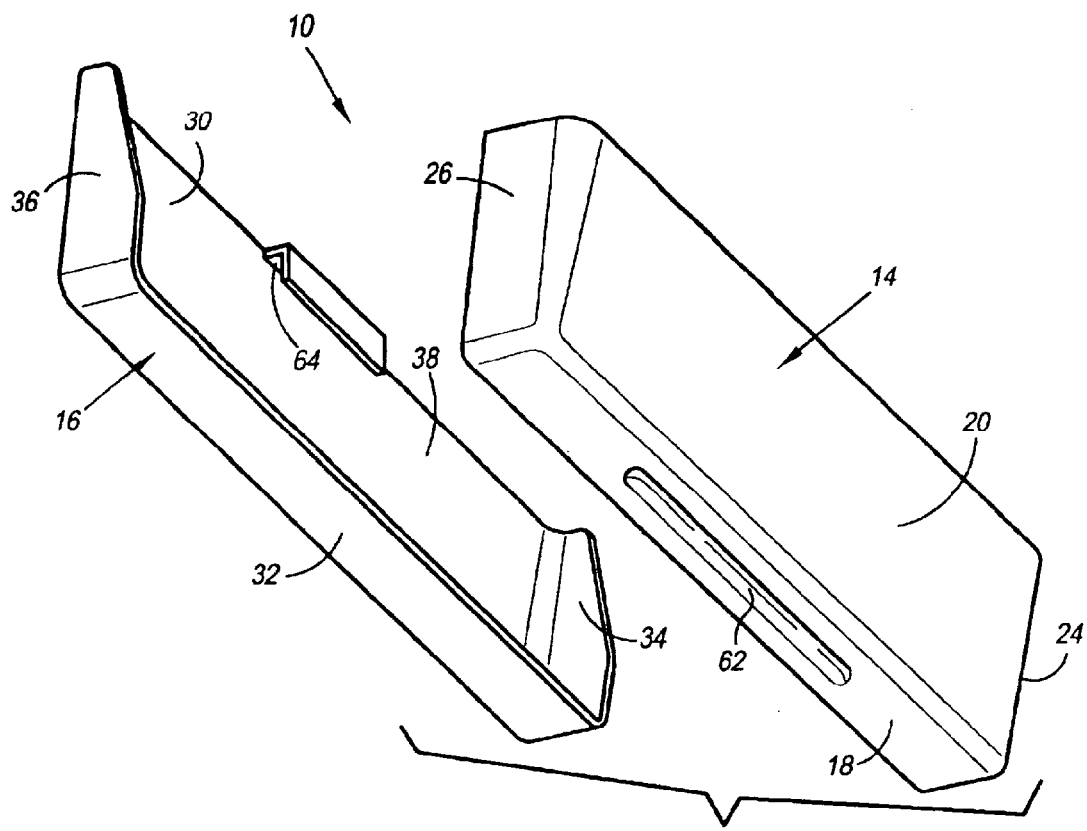
FIG. 7 is a bottom perspective view of a second embodiment of the litter scoop holder illustrating the receptacle bottom wall recess.
Figure 8:
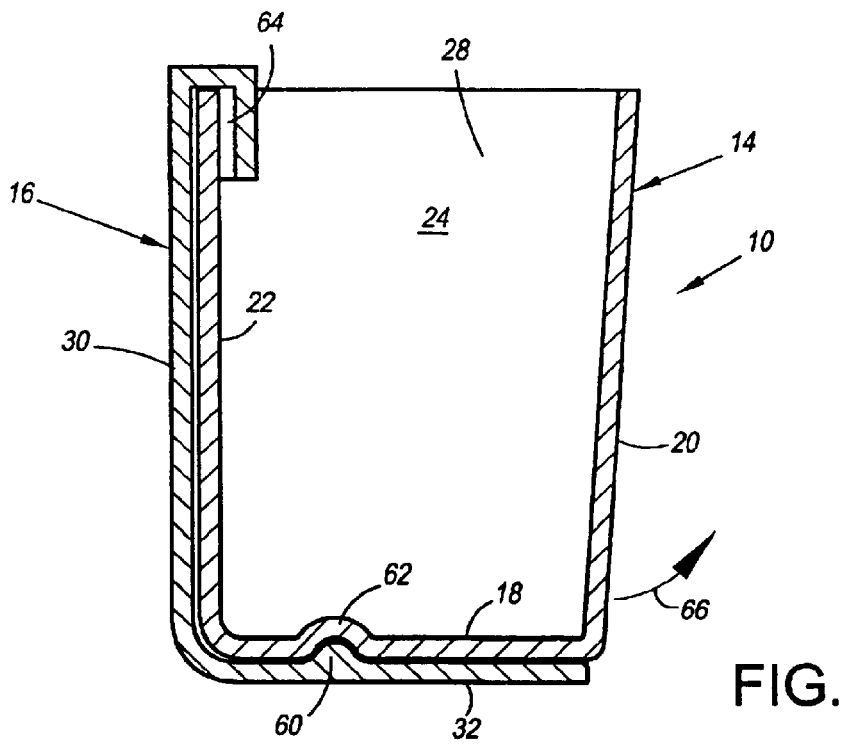
FIG. 8 is a section view of the litter scoop holder taken along the line 8—8 of FIG. 6 illustrating the detent and recess locking arrangement in the locked position.
Figure 9:
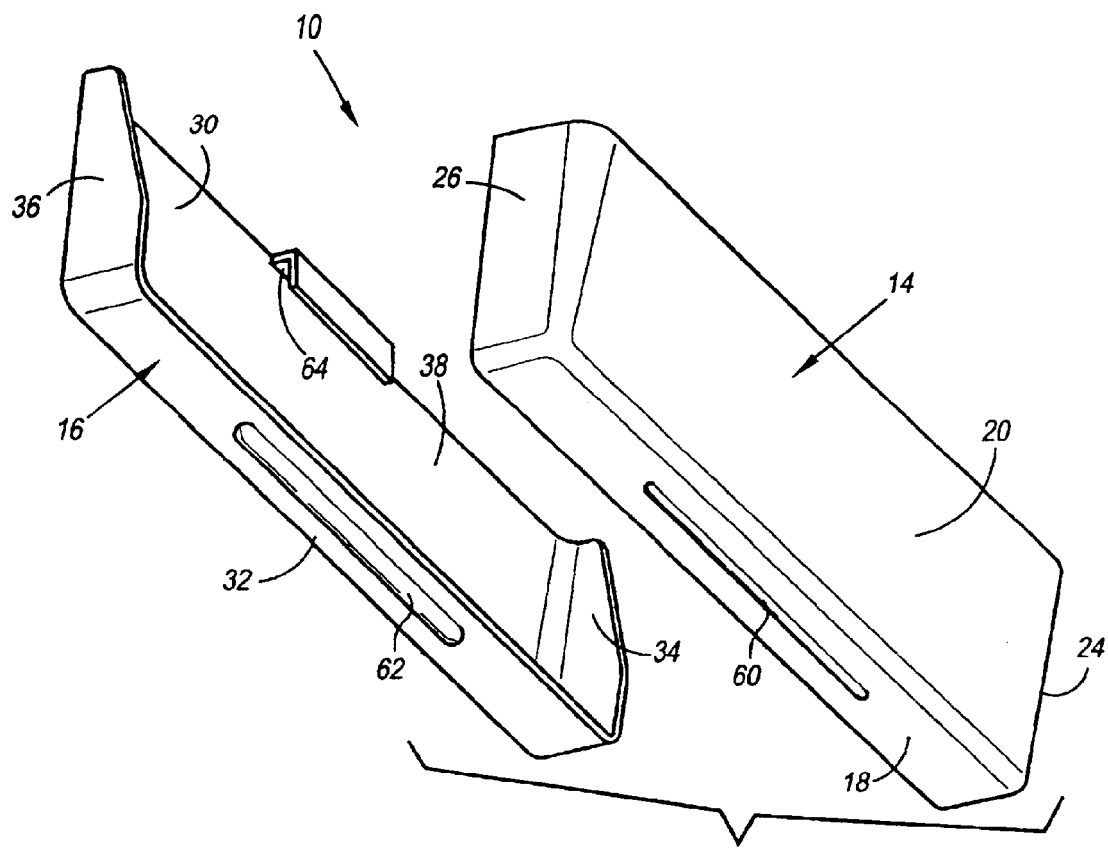
FIG. 9 is a bottom perspective view of a third embodiment of the litter scoop holder illustrating the receptacle bottom wall detent and support recess.
Figure 10:
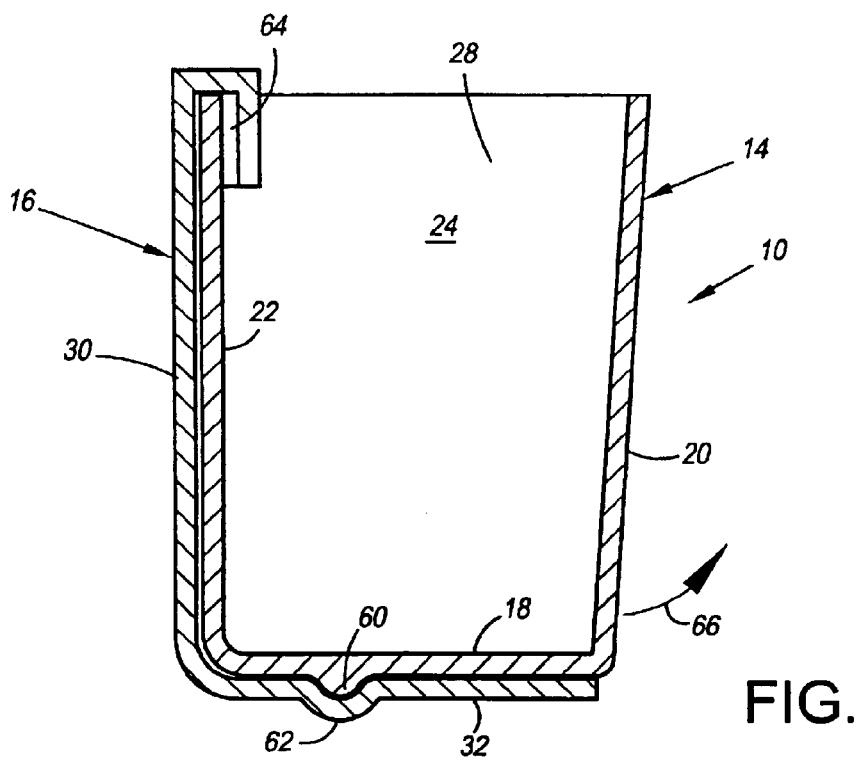
FIG. 10 is a section view of the litter scoop holder taken along the line 10—10 of FIG. 6 illustrating the detent and recess locking arrangement in the locked position.

FIGS. 6-8 illustrate a second embodiment of scoop holder 10 containing a detent 60 for securely fastening receptacle 14 to support 16. Detent 60 is preferably integrally molded to and protrudes from support floor 32 so as to engage a recess 62 located on receptacle floor 18. Alternatively, detent 60 can be integrally molded to and protrude from receptacle floor 18 so as to engage recess 62, located on support floor 32, as best seen in FIGS. 9 and 10.

In order to place receptacle in the locked position, receptacle 14 is angularly inserted into receptacle support area 38 so that the top portion of receptacle rear wall 22 is inserted inside support slot 64. Receptacle 14 is then rotated until recess 62 engages detent 60, to securely fasten receptacle 14 to support 16, as best seen in FIGS. 8 and 10. In order to remove receptacle 14 from the locked position, the user applies sufficient force to rotate receptacle 14 in the direction of arrow 66 to overcome the locking force created by the detent.

Other alterations and modifications of the invention will likewise become apparent to those of ordinary skill in the art upon reading the present disclosure, and it is intended that the scope of the invention disclosed herein be limited only to the broadest interpretation of the appended claims to which the inventor is legally entitled.

I claim:

1. A litter scoop holder for supporting a litter scoop, the holder comprising:
   a receptacle for receiving the litter scoop, said receptacle including a floor, a front wall, a rear wall, a pair of sidewalls and an open top to receive and hold the litter scoop, said receptacle rear wall including a locking tab and said receptacle floor including a rib extending therefrom; and
   a support member for releasably supporting said receptacle in a locked position, said support member having a wall and a floor, said support wall having a slot adapted to receive said receptacle locking tab and said support floor including an aperture adapted to receive said receptacle rib, wherein when said receptacle is in said locked position, said receptacle locking tab is positioned in said support wall slot and said rib is disposed inside said aperture.

2. The litter scoop holder of claim 1 wherein said support member floor contains a flexible release tab and said support member floor aperture is disposed within said flexible release tab.

3. The litter scoop holder of claim 2, wherein when said receptacle is configured in said locked position, said receptacle locking tab is inserted in said support member slot and said receptacle is pivoted, such that said receptacle rib slideably engages and deflects said flexible release tab until said flexible release tab receives and secures said rib in said support member floor.

4. The litter scoop holder of claim 1 wherein said support member further includes a pair of sidewalls for engaging said receptacle.

5. The litter scoop holder of claim 2 wherein said receptacle front wall contains a recessed area to allow access to said release tab when said receptacle is in said locked position.

6. A litter scoop holder for supporting a litter scoop, the holder comprising:
   a receptacle adapted to receive the litter scoop and a support member to releasably support said receptacle, said receptacle being positionable between a locked position, wherein said receptacle is secured to said support member, and an unlocked position, wherein said receptacle is separated from some said support member;
   said receptacle including a floor, a front wall, a rear wall and a pair of sidewalls and an open top to receive and support the litter scoop;
   said support member having a wall and a floor including a detent, said member wall having a slot adapted to receive and engage said receptacle rear wall when in said locked position; and
   said receptacle floor having a recess to receive said detent in said locked position.

7. The litter scoop holder of claim 6 wherein said support member further includes a pair of sidewalls to prevent lateral movement of said receptacle.

8. A litter scoop holder for attachment to a cat litter box, the holder comprising:
   a receptacle for receiving the litter scoop, said receptacle including a floor, a front wall, a rear wall, a pair of sidewalls and an open top to receive and hold the litter scoop, said receptacle rear wall including a locking tab and said receptacle floor including a rib extending therefrom;
   a support member for releasably supporting said receptacle in a locked position, said support member having a wall and a floor, said support wall having a slot adapted to receive said receptacle locking tab and said support floor including an aperture adapted to receive said receptacle rib, wherein when said receptacle is in said locked position, said receptacle locking tab is positioned in said support wall slot and said rib is disposed inside said aperture; and wherein said support member wall attaches to the litter box.

9. The litter scoop holder of claim 8 wherein double sided adhesive attaches said support member wall to the litter box.

10. The litter scoop holder of claim 8 wherein a hook and pile fastener attaches said support member to the litter box.

11. A litter scoop holder for supporting a litter scoop, the holder comprising:

receptacle adapted to receive the litter scoop and a support member to releasably support said receptacle, said receptacle being positionable between a locked position, wherein said receptacle is secured to said support member, and an unlocked position, wherein said receptacle is separated from some said support member;

said receptable including a floor, a front wall, a rear wall and a pair of sidewalls and an open top to receive and support the litter scoop, said receptacle floor having a detent; and said support member having a wall and a floor, said floor including a recess to receive said detent and said member wall having a slot adapted to receive and engage said receptacle rear wall when in said locked position.

* * * * *